US012592514B2

(12) United States Patent
Urbaniak et al.

(10) Patent No.: US 12,592,514 B2
(45) Date of Patent: Mar. 31, 2026

(54) ELECTRICAL CONNECTOR

(71) Applicant: Aptiv Technologies AG, Schaffhausen (CH)

(72) Inventors: Andreas Urbaniak, Münster (DE); Uvaraj Ganesan, Chennai (IN); Rainer Schmidt, Nuremberg (DE); Kavinraj Vadivel, Salem (IN)

(73) Assignee: Aptiv Technologies AG, Schaffhausen (CH)

( * ) Notice: Subject to any disclaimer, the term of this patent is extended or adjusted under 35 U.S.C. 154(b) by 361 days.

(21) Appl. No.: 18/374,258

(22) Filed: Sep. 28, 2023

(65) Prior Publication Data

US 2024/0113474 A1 Apr. 4, 2024

(30) Foreign Application Priority Data

Sep. 29, 2022 (EP) .................................... 22198747

(51) Int. Cl.
*H01R 13/629* (2006.01)

(52) U.S. Cl.
CPC . *H01R 13/62944* (2013.01); *H01R 13/62955* (2013.01); *H01R 13/62961* (2013.01)

(58) Field of Classification Search
CPC ........ H01R 13/62944; H01R 13/62955; H01R 13/62961
USPC ........................................................... 439/82
See application file for complete search history.

(56) References Cited

U.S. PATENT DOCUMENTS 5,873,745 A * 2/1999 Duclos ............. H01R 13/62944 439/372
6,572,391 B2 6/2003 Mochizuki et al.
8,356,999 B2 1/2013 Imai
9,048,579 B2 * 6/2015 Itou .................. H01R 13/62944
10,374,356 B2 8/2019 Amerio et al.
11,437,758 B1 * 9/2022 Reedy .............. H01R 13/62955
2001/0019908 A1 9/2001 Zweigle
2016/0285200 A1 9/2016 Eow et al.
(Continued)

FOREIGN PATENT DOCUMENTS

DE 102020001995 A1 * 9/2021 ....... H01R 13/62944
EP 0556762 B1 6/1996
EP 2654134 A1 10/2013
(Continued)

OTHER PUBLICATIONS

Extended European Search Report for Application No. 22198747.2; Mailed Mar. 15, 2023; 12 pages.

*Primary Examiner* — Tulsidas C Patel
*Assistant Examiner* — Jeffrey Mountain
(74) *Attorney, Agent, or Firm* — Billion & Armitage

(57) ABSTRACT

An electrical connector includes a connector housing and a U-shaped lever, comprising a crossbar and two sidebars extending from the ends of the crossbar. A pair of first gear wheel elements. Each one of the first gear wheel elements is integrally formed at respective ends of the sidebars and are rotatable around a pair of first rotation pins extends to the outside from opposing outer side walls of the connector housing. The first gear wheel elements each comprise a first set of gear teeth for meshing with a teethed rack of a counter electrical connector. The first gear wheel elements each comprise a second set of gear teeth for meshing with second gear wheel elements.

20 Claims, 12 Drawing Sheets

(56) References Cited

U.S. PATENT DOCUMENTS

| | | | | |
|---|---|---|---|---|
| 2018/0309237 | A1* | 10/2018 | Lesniak | H01R 13/6295 |
| 2022/0077630 | A1 | 3/2022 | Asano | |

FOREIGN PATENT DOCUMENTS

| | | | |
|---|---|---|---|
| EP | 2274800 | B1 | 3/2018 |
| JP | 5146776 | B2 | 12/2012 |
| JP | 5229570 | B2 | 3/2013 |
| JP | 2013214436 | A | 10/2013 |
| KR | 20120018414 | A | 3/2012 |

* cited by examiner

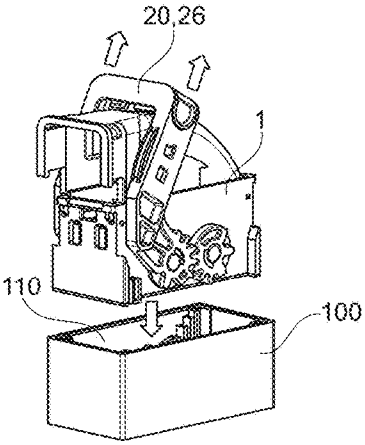
Fig. 11A
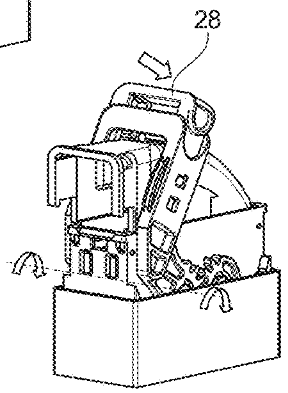
Fig. 11B
Fig. 11E
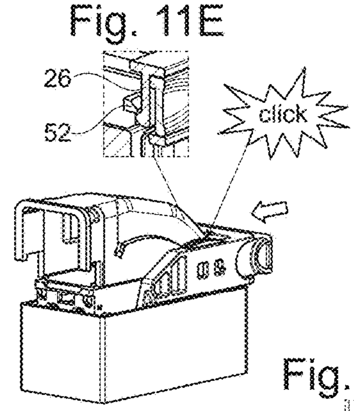
Fig. 11C
Fig. 11F Fig. 11G
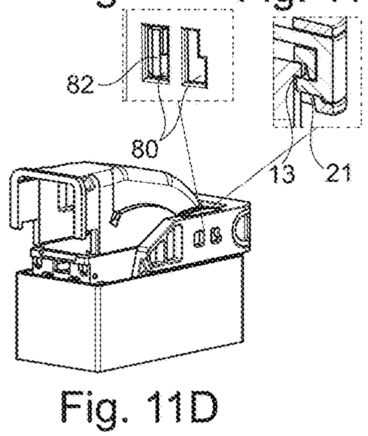
Fig. 11D

ELECTRICAL CONNECTOR

CROSS-REFERENCE TO RELATED APPLICATION

This application claims benefit of priority to European Patent Application No. 22198747.2 filed on Sep. 29, 2022, the entire disclosure of which is hereby incorporated by reference.

TECHNICAL FIELD OF THE INVENTION

The present disclosure generally relates to an electrical connector and corresponding electrical connector assemblies. Particularly it relates to an electrical connector comprising connector modules from a set of connector modules that is matingly connected to a corresponding counter electrical connector and disconnected by operation of a lever of the electrical connector.

BACKGROUND

A common "lever-type" electrical connector includes an assembly of a first connector or housing and a second connector or header. To mate the connectors together, the assembly has an actuating or assist lever mounted for pivoting on the first connector with pivoting of the lever causing the first and second connectors to shift between unmated and fully mated configurations. Usually, the actuating lever and the second connector typically have a cam groove and a cam follower arrangement for drawing the second connector into mating condition with the first connector in response to pivoting of the lever. Such connectors are commonly used in the automotive industry but require a complex mechanics.

A typical example for such lever-type electrical connectors is to provide a generally U-shaped lever structure having a pair of relatively thin-walled lever arms that are disposed on opposite sides of the housing connector. The lever arms may have cam grooves for engaging cam follower projections or posts on opposite sides of the header assembly. These types of lever connectors are often used where relatively large forces are required to mate and un-mate a pair of connectors. For instance, frictional forces encountered during connecting and disconnecting the connectors may make the process difficult to perform by hand. In some cases, relatively large electrical connectors with high pin counts, such as connectors with 90 or more pin contacts, require at least about 300 N to mate or un-mate the connectors. Further, automotive industry standards specify a maximum of 75 N of user input force be required to perform this mating and un-mating of the connectors.

An example of such a lever-type connector with a U-shaped lever engaging cam-grooves is disclosed in the patent document U.S. Pat. No. 10,374,356 B2.

Although such lever-type connectors provide significant advantages over connectors without mating aid, current lever-actuator configurations have problems to mate or to un-mate large connectors such as described above while keeping user input force at or below the level specified by the industry standard. With current lever connector configurations, the mechanical advantage provided by the lever actuators is not sufficient to overcome the high frictional forces seen by large electrical connector assemblies between pins and sockets of the connectors as they are mated and un-mated. At the interface between the cam projection and grooves, there are inefficiencies generated in the force transfer between the input force applied to the lever and the output force applied by the lever to the other connector requiring greater efforts by the user than as desired for mating and un-mating the connectors together.

The patent document EP 2 274 800 B1 describes an electrical connector assembly with a first connector and a header to which the first connector mounts. The first connector comprises a generally U-shaped lever and drive gears with a lever lobe extending from one side and drive gears extending from another side. The lever lobes during mating of the connectors are received in horizontal cam tracks on each longitudinal side of the header. The drive gears and the lever lobes are positioned inside the housing of the first connector, whereas the lever is mainly positioned outside the housing. Thus, this connector requires a complex mounting procedure and has an increased dimension in transverse direction.

The object of the present disclosure is to overcome the disadvantages of the prior art connectors, particularly provide an electrical connector that is flexible in use, can be mated and un-mated with little effort, provides a reliable design, can be easily mounted and has only a small footprint.

SUMMARY

An electrical connector and a connector assembly are presented herein. The electrical connector comprising a connector housing, comprising at least one slot holding a connector module with electrical contacts from a set of connector modules; a U-shaped lever, comprising a crossbar and two sidebars extending from the ends of the crossbar; a pair of first gear wheel elements, each one integrally formed at a respective ends of the sidebars and being rotatable around a pair of first rotation pins extending to the outside from opposing outer side walls of the connector housing; wherein the first gear wheel elements each comprise a first set of gear teeth for meshing with a teethed rack of a counter electrical connector; and the first gear wheel elements each comprise a second set of gear teeth for meshing with second gear wheel elements; wherein the first set of gear teeth comprise a first rotation radius of the first gear wheel elements around the first rotation pins; and wherein the second set of gear teeth comprise a second rotation radius of the first gear wheel elements around first the rotation pins; wherein the first rotation radius is different to the second rotation radius.

Such an electrical connector is modular, as it has at least one slot, preferably a plurality of slots, in the connector housing, which can be fitted with a connector module that carries the electrical contacts, wherein the connector module is one module of a set of different connector modules. For example, 3-way, 4-way, 14-way, 18-way or 26-way connector modules can be used, which have all the same length and width but provide different electrical contact configurations for 3, 4, 14, 18 or 26 electrical contacts. Thus, the same electrical connector can be individualized by using the desired connector module or modules of a set of plurality of connector modules. The connectors modules have substantially the same outer dimensions and outer shape of the side walls to be mechanically fixed within the slot or the slots in the connector housing. Thus, any one of the set of connector modules can be seated within any of the housing slots.

Although the modular design of the electrical connector provides the desired flexibility for the electrical contacts it generates problems regarding the necessary mating forces. For example, a 0.50 26-way module may have a mating force of 65 N, whereas a 2.80 4-way module may have a mating force of 40 N. Different connector modules in one connector may generate a disbalance of the mating force over the mating surface. Therefore, the electrical connector provides a U-shaped lever to facilitate mating. To this end, the U-shaped lever has a pair of gear wheel elements that are integrally formed at the end of the sidebars of the lever. The gear wheel elements comprise a "double gear configuration", thus they integrate two different gear wheels into one. The first gear wheel elements each comprise a first set of gear teeth for meshing with a teethed rack of a counter electrical connector. Further, the first gear wheel elements each comprise a second set of gear teeth for meshing with second gear wheel elements. The first set of gear teeth comprise a first rotation radius of the first gear wheel elements around the first rotation pins. The first rotation radius can be adapted to the necessary mating force and travel necessary. The smaller the first rotation radius, or the length, of the first set of gear teeth is selected the larger the mating force will be, when the lever is rotated. Further, since a set of gear teeth is used to mesh with a teethed rack of the counter electrical connector the force introduction during the mating procedure is always parallel to the mating direction. Thus, no lateral forces apply to the electrical connector which would increase the friction during the mating procedure. Further, the mating of gear teeth with a teethed rack provides a rolling contact of the contact faces what generates almost no friction. Therefore, the force introduced by the lever is almost fully transmitted into a mating or un-mating force without significant losses, like the friction that is generated in prior art designs.

Further, the second set of gear teeth comprise a second rotation radius of the first gear wheel elements around first the rotation pins, wherein the first rotation radius is different to the second rotation radius. Thus, the second rotation radius can be selected according to the desired distance between the first gear wheel elements and second gear wheel elements that are driven by the first gear wheel elements and the lever. Preferably, the second gear wheel elements also introduce a mating force between the electrical connector and its counter connector. The larger the second rotation radius will be, the larger the distance of the force introduction points will be, which provides a good balance of the mating forces. Preferably, the electrical connector provides four force introduction points, two on each lateral side of the electrical connectors, which are distanced from each other to ensure a parallel mating of the electrical connector and its counter connector by rotating the lever.

Since the first gear wheel elements are rotatable around a pair of first rotation pins extending to the outside from opposing outer side walls of the connector housing the lever can be easily mounted to the connector housing without complex mounting steps or excessive bending of the sidebars. This generally flat design of the sidebars also facilitates force transmission from the manually actuated crossbar via the two sidebars to the integral first gear wheel elements. Thus, the overall lateral dimension of the electrical connector is decreased compared to the more complex prior art designs.

Preferably, the connector further comprises a pair of second gear wheel elements being rotatable around a pair of second rotation pins extending to the outside at the opposing outer side walls of the connector housing, wherein the second gear wheel elements each comprise a third set of gear teeth and a fourth set of gear teeth; wherein the third set of gear teeth comprise a third rotation radius of the second gear wheel elements around the rotation pins; and wherein the fourth set of gear teeth comprise a fourth rotation radius of the gear wheel elements around the rotation pins; wherein the third rotation radius is different to the fourth rotation radius. As for the pair of first gear wheel elements the pair of second gear wheel elements comprise a "double gear configuration", thus they integrate two different gear wheels into one, which has the same advantages as for the first gear wheel elements. With the pair of second gear wheel elements the electrical connector provides four force introduction points with the counter connector for the mating or un-mating force.

Preferably, the second gear wheel elements mesh with and are driven by the first gear wheel elements. Thus, the second gear wheel elements rotate in opposite direction with the first gear wheel elements when the lever is rotated.

Preferably, the second set of gear teeth of the first pair of gear wheel elements meshes with the fourth set of gear teeth of the second pair of gear wheel elements and the second rotation radius equals the fourth rotation radius. Thus, the rotation speed of the second gear wheel elements equals the rotation speed of the first gear wheel elements.

Preferably, the first rotation radius is smaller than the second rotation radius. Thus, the force applied by the first set of gear teeth to the teethed rack is larger than the force applied by the second set of gear teeth to the fourth set of gear teeth of the second gear wheel elements.

Preferably, the third rotation radius is smaller than the fourth rotation radius and/or the third rotation radius equals the first rotation radius. Thus, the second gear wheel elements correspond in terms of gear teeth with the first gear wheel elements.

Preferably, the connector housing comprises two to eight slots for holding a corresponding number of connector modules from the set of connector modules. Thus, the electrical connector can be easily configured for a multitude of different contact options.

Preferably, the first rotation pins and/or the second rotation pins comprises integral locks for respectively holding the first gear wheel elements and/or the second gear wheel elements on the first and/or second rotation pins. Thus, the first and/or second gear wheel elements are securely held on the respective rotation pins without additional mounting means, which could be lost or have to be manually attached.

Preferably, the electrical connector further comprises a cover attached to a top side of the housing, wherein the cover comprises a cover latch that latches with the lever, when the lever is in a fully closed position in which the electrical connector fully engages its counter electrical connector. The cover latch together with the lever serves as a security measure to maintain the electrical connectors securely mated even in rough conditions, i.e., in automotive applications.

Preferably, the lever comprises a lever base and a telescopic lever arm slidably attached to the lever base, such that the telescopic lever arm can adopt an extended and a shortened position. In the extended position of the lever arm less actuation force is needed by the user for mating or un-mating the connectors. In the shortened position the lever and therefore the overall electrical connector consumes less space.

Preferably, the telescopic lever arm comprises protrusions that are configured to latch within pockets of a cover, when the lever is in a pre-assembly position and when the telescopic lever arm adopts the shortened position. Thus, the telescopic lever arm locks the lever in a pre-assembly position, when the lever arm is shifted at this rotational position to its shortened position.

Preferably, the protrusions are additionally configured to latch within pockets of the connector housing when the lever is in a fully closed position and when the telescopic lever arm adopts the shortened position. Thus, the telescopic lever arm locks the lever in a fully closed position, when the lever arm is shifted at this rotational position to its shortened position.

Preferably, the first rotation pins are offset from the center of the outer side walls seen in longitudinal extension direction of said walls. The longitudinal extension direction of the walls is perpendicular to the mating direction of the connector. By arranging the rotation pins offset from the center, it is possible to increase the length of the effective lever arm, compared to e.g., a central location of the rotating pins, without increasing the overall space required for the connector.

Preferably, the above-mentioned object is also realized by an electrical connector assembly comprising an electrical connector as described above and a counter connector, wherein the counter connector comprises two or four teethed racks.

BRIEF DESCRIPTION OF THE DRAWINGS

The present invention is now described, by way of example with reference to the accompanying drawings, in which:

FIGS. 11A to 11D show isometric views of an electrical connector assembly with an electrical connector of FIG. 8A in a mating process according to some embodiments;

FIGS. 11E to 11G show detailed isometric views of the electrical connector of FIGS. 11C and 11D according to some embodiments.

DETAILED DESCRIPTION

Figure 1:
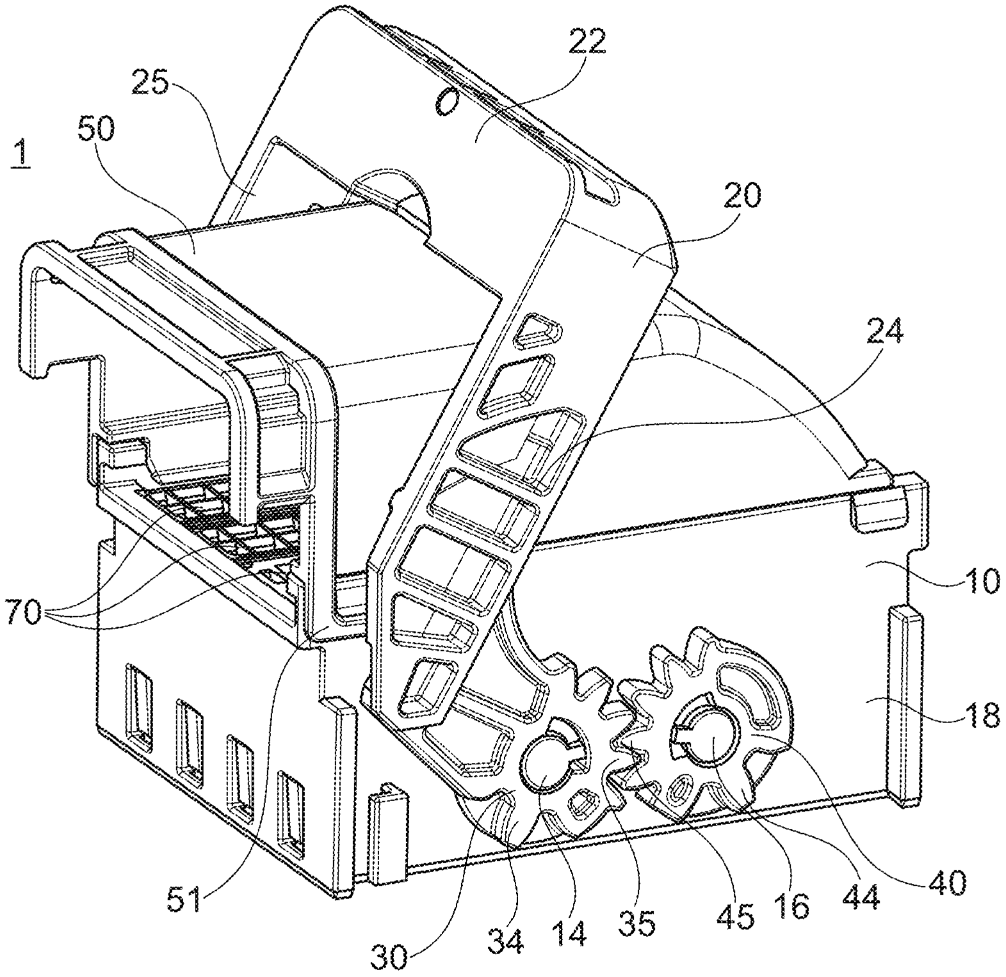
FIG. 1 shows an isometric view of an electrical connector according to some embodiments.

FIG. 1 shows an electrical connector 1 according to a first embodiment. The electrical connector 1 comprises a connector housing 10, a U-shaped lever 20, a pair of first gear wheel elements 30, 31 and a pair of second gear wheel elements 40, 41 and a plurality of connector modules 70 and a cover 50. By rotating the lever 20 the first pair of gear wheel elements 30, 31 rotate, which drive the second pair of gear wheel elements 40, 41. These gear wheel elements 30, 31, 40, 41 mesh with teethed racks 102, 104, 106, 108 of a counter connector 100 (see FIGS. 2A and 2B)

The housing 10 comprises one or more slots 12 for holding the respective number of connector modules 70. The connector modules 70 are inserted from the top into the slots 12 of the connector housing 10 and preferably latch therein by means of elastic latches 11, 71 (see FIG. 5C) within the slots 12 or at the connector modules 70.

The cover 50 closes the upper end of the electrical connector 1 and protects the cables (not shown) and connector modules 70 from mechanical damage. Preferably the cover is hooked to the connector housing 10 by a positive fit at the front end and by latching means 51 at the rear end.

The lever 20 is generally U-shaped and comprises a generally horizontal crossbar 22 and two generally vertical sidebars 24, 25. The sidebars 24, 25 extend generally perpendicular from the ends of the crossbar 22.

The lever 20 further comprises the pair of first gear wheel elements 30, 31 which are integrally formed with the lower end of the respective sidebars 24, 25. The first gear wheel elements 30, 31, and thus the overall lever 20, are rotatably mounted to the lateral side walls 18(see FIGS. 2A and 2B) of the connector housing around rotation pins 14, 15. The rotation pins 14, 15 extend from the opposing side walls 18 vertically to the outside. As one can take from the figures, the rotation pins 14, 15 are offset from the center of the outer side walls seen in longitudinal extension direction of said walls. Thereby, the effective length of the lever arms can be increased without negatively affecting the overall longitudinal extension of the connector, compared to a situation where the rotating pin is arranged centrally in the middle of the housing walls.

Figure 2A:
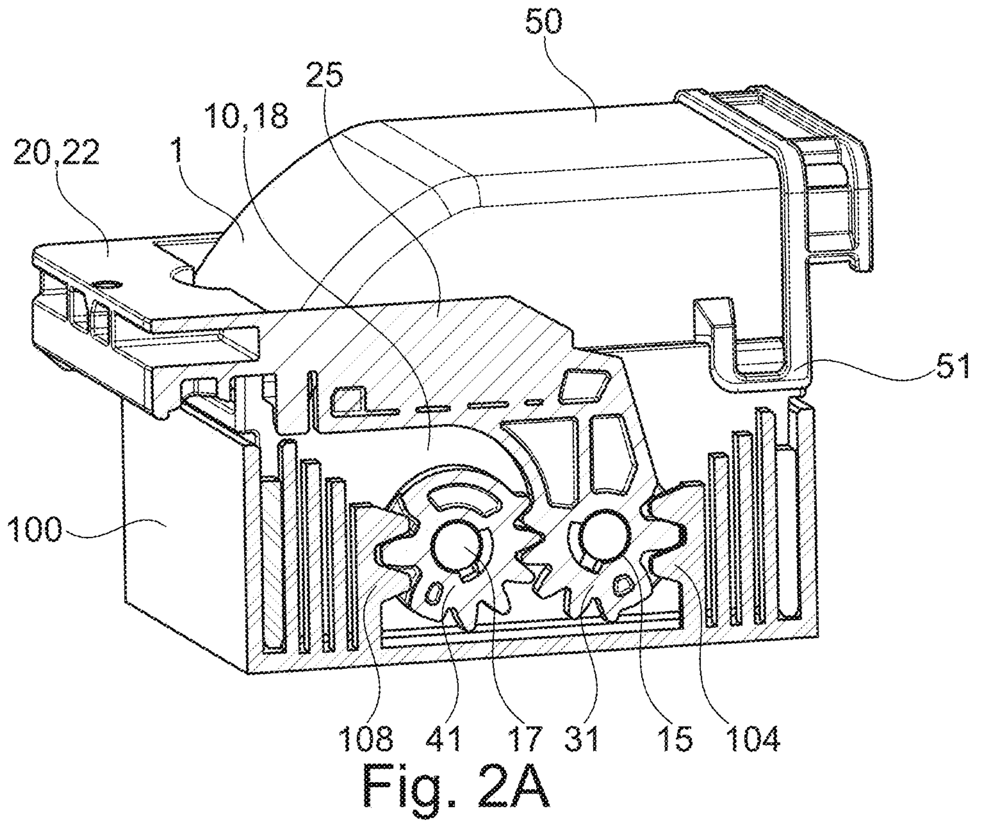
FIG. 2A shows an isometric view of the right side of an electrical connector system according to some embodiments.
Figure 2B:
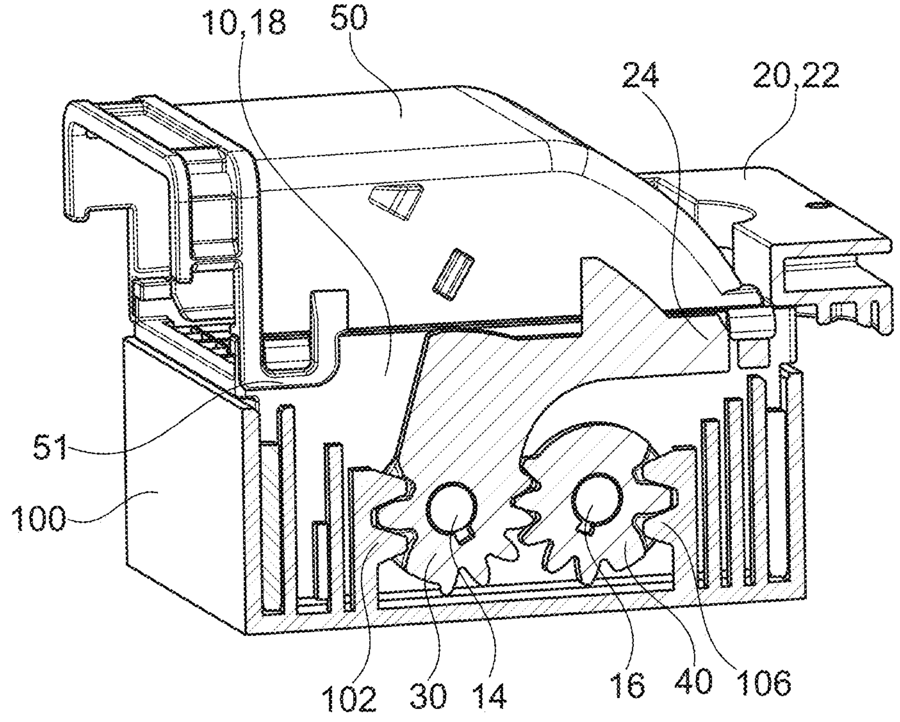
FIG. 2B shows an isometric of the left side of the electrical connector system of FIG. 2A according to some embodiments.

The first gear wheel elements 30, 31 each comprise a first set of gear teeth 34 for meshing with a teethed rack 102, 104, 106, 108 of a counter electrical connector 100 (see FIGS. 2A and 2B). In addition, the first gear wheel elements 30, 31 each comprise a second set of gear teeth 35 for meshing with second gear wheel elements 40, 41. Thus the first gear wheel elements 30, 31 comprise a "double gear configuration" by integrating two different gear wheels into one. In the shown embodiment the first set of gear teeth 34 adopts a section of the first gear wheel element 30, 31 and generally points to the front or back of the connector 10. The second set of gear teeth 35 adopts another section of the first gear wheel element 30, 31 and generally points to the center of the connector 10. The first set of gear teeth 34 comprise only one full tooth and two have teeth, however, the number of teeth of the first and second set of gear teeth 34, 35 can vary as appropriate.

Figure 3A:
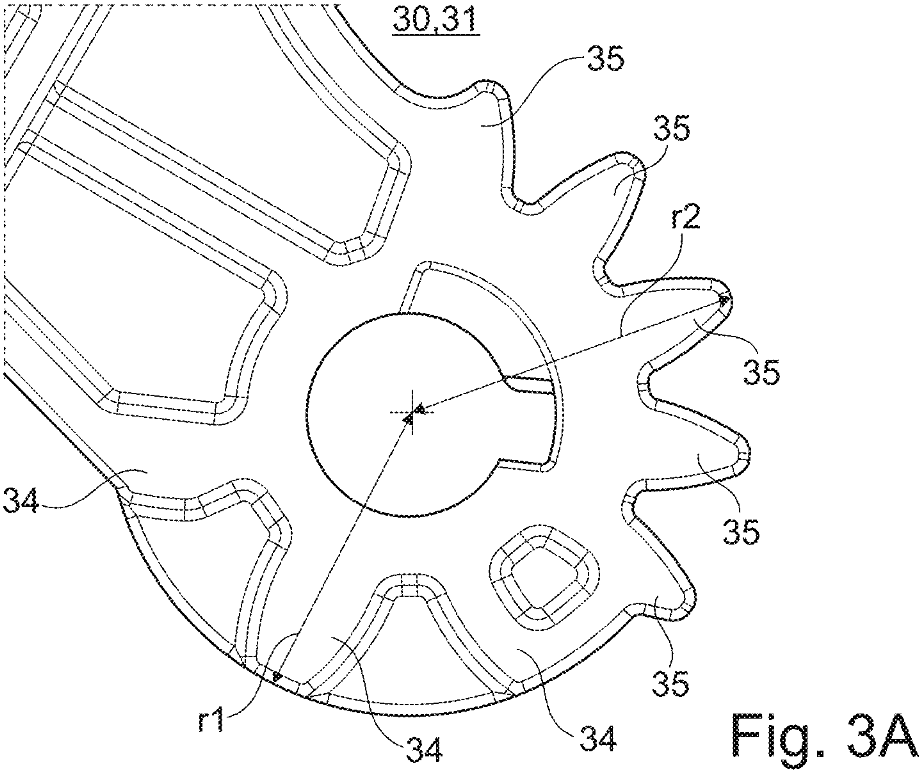
FIG. 3A shows a side view of a first gear element according to some embodiments.
Figure 3B:
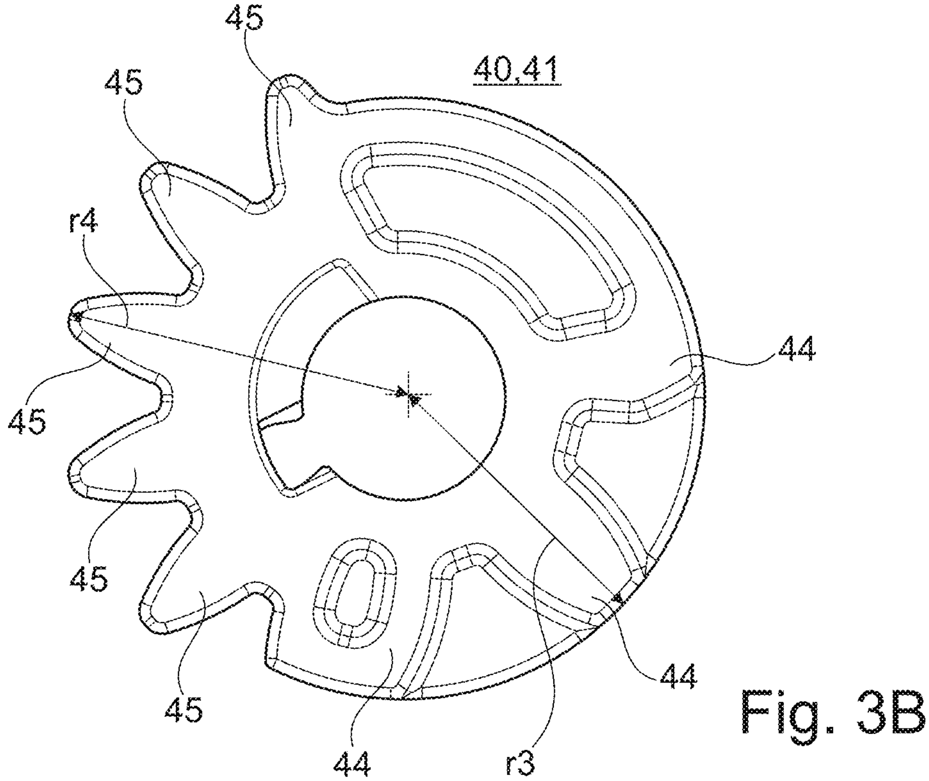
FIG. 3B shows a side view of a second gear element according to some embodiments.

As best shown in FIG. 3A the first set of gear teeth 34 comprise a first rotation radius r1 of the first gear wheel elements 30, 31 around the first rotation pins 14, 15. The second set of gear teeth 35 comprise a second rotation radius r2 of the first gear wheel elements 30, 31 around first the rotation pins 14, 15, wherein the first rotation radius r1 is different to the second rotation radius r2. Thus, the distance between the first and second gear wheel elements 30, 31, 40, 41 can be chosen independently from the desired or necessary length or radius of the first set of gear teeth 34 which determines the mating force of the electrical connector 10 generated by rotation of the lever 20. The shorter the length or radius of the first set of gear teeth 34 the higher the mating force or the lower the necessary actuation force of a user. Preferably, the first rotation radius r1 is smaller than the second rotation radius r2. In the shown embodiment the first rotation radius r1 is 8 mm and the second rotation radius r2 is 9.1 mm.

Similar considerations apply for the pair of second gear wheel elements 40, 40. The second gear wheel elements 40, 41 being rotatable around a pair of second rotation pins 16, 17 extending to the outside at the opposing outer side walls 18 of the connector housing. The second gear wheel elements 40, 41 each comprise a third set of gear teeth 44 and a fourth set of gear teeth 45. Thus, the second gear wheel elements 40, 41 also comprise a "double gear configuration" by integrating two different gear wheels into one. In the shown embodiment the third set of gear teeth 44 adopts a section of the second gear wheel element 40, 41 and generally points to the front or back of the connector 10. The fourth set of gear teeth 45 adopts another section of the second gear wheel element 40, 41 and generally points to the center of the connector 10. The third set of gear teeth 44 comprise only one full tooth and two have teeth, however, the number of teeth of the third and fourth set of gear teeth 44, 45 can vary as appropriate.

The third set of gear teeth 44 comprise a third rotation radius r3 of the second gear wheel elements 40, 41 around the rotation pins 16, 17. The fourth set of gear teeth 45 comprise a fourth rotation radius r4 of the gear wheel elements 40, 41 around the rotation pins 16, 17, wherein the third rotation radius r3 is different to the fourth rotation radius r4. Thus, again the distance between the first and second gear wheel elements 30, 31, 40, 41 can be chosen independently from the desired or necessary length or radius of the third set of gear teeth 44, which determines the mating force of the electrical connector 10 generated by rotation of the lever 20. Preferably, the third rotation radius r3 is smaller than the fourth rotation radius r4. In the shown embodiment the third rotation radius r3 is 8 mm and the fourth rotation radius r4 is 9.1 mm.

Figure 4:
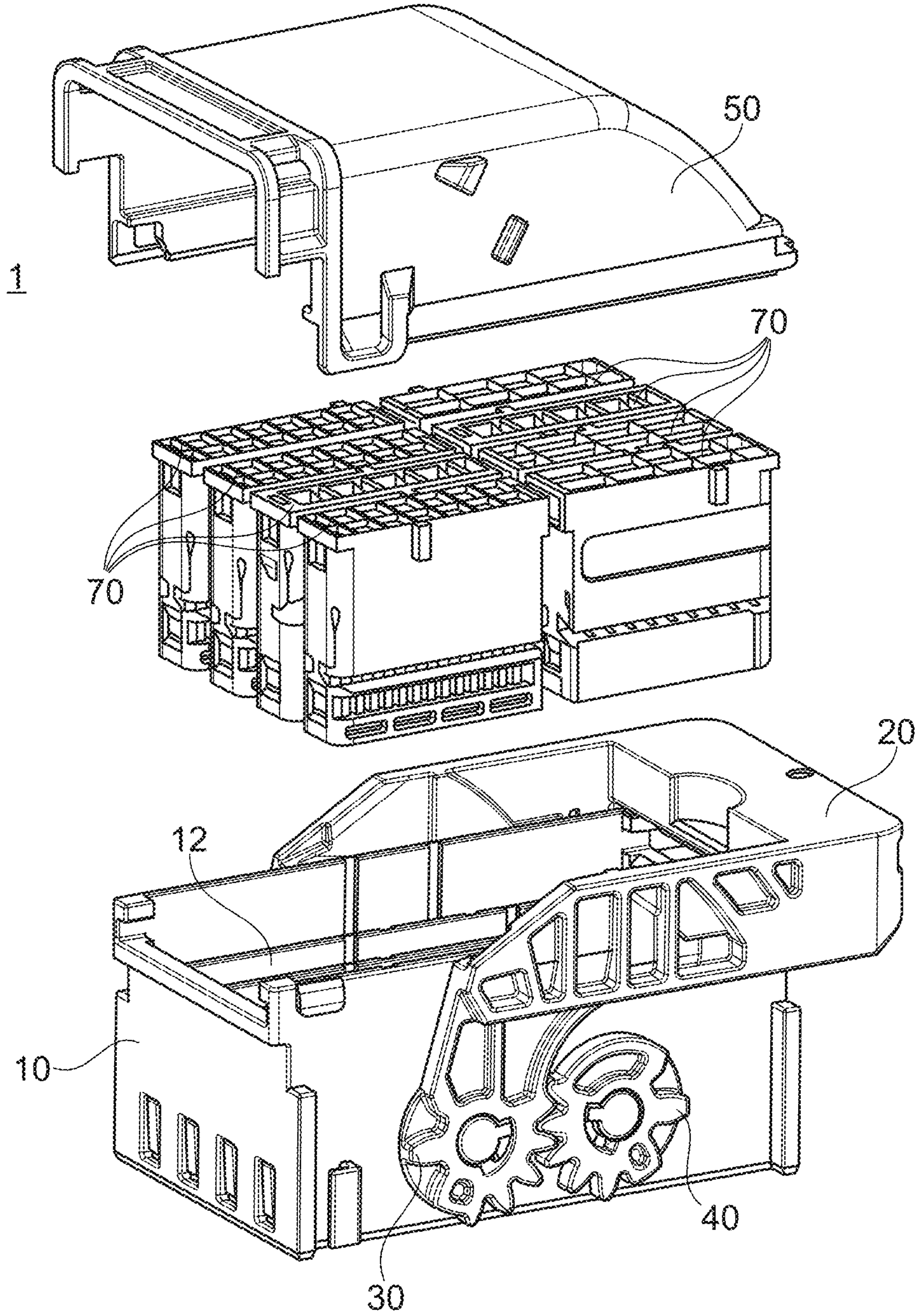
FIG. 4 shows an exploded view of the electrical connector of FIG. 1 according to some embodiments.

FIG. 4 shows that the electrical connector 1 can be equipped with different connector modules 70 that are inserted into the slots 12 of the connector housing 10. Thus, the electrical connector is modular and can be electrically configured as desired. As shown in FIGS. 4 and 5C the housing 10 in this embodiment comprises eight slots 12 for eight individual connector modules 70. The connector modules 70 can be individually chosen from a set of different connector modules 72, which is exemplarily shown in FIG. 5A.

Figure 5A:
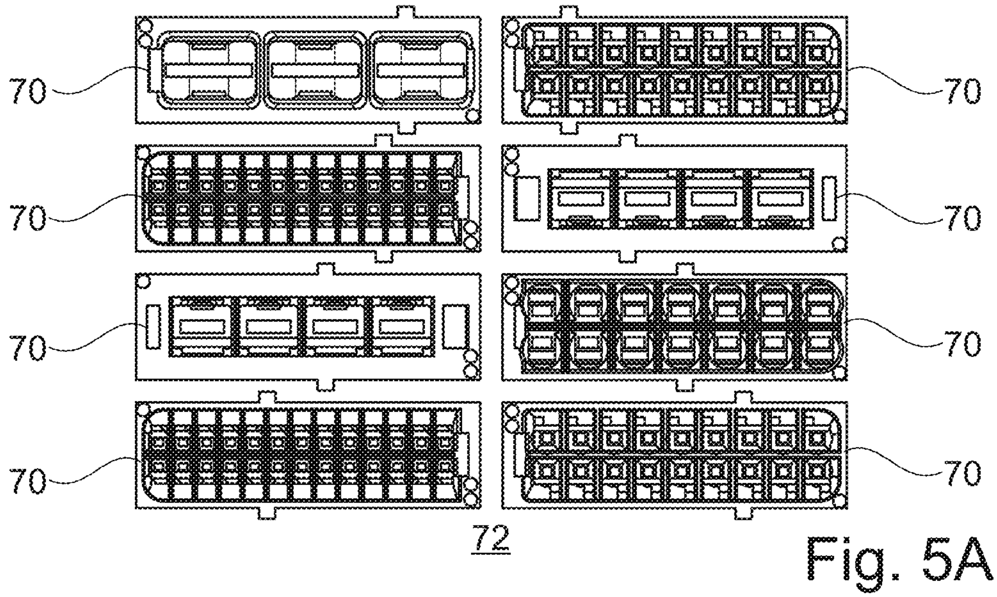
FIG. 5A shows a top view of an embodiment of a set of connector modules according to some embodiments.
Figure 5B:
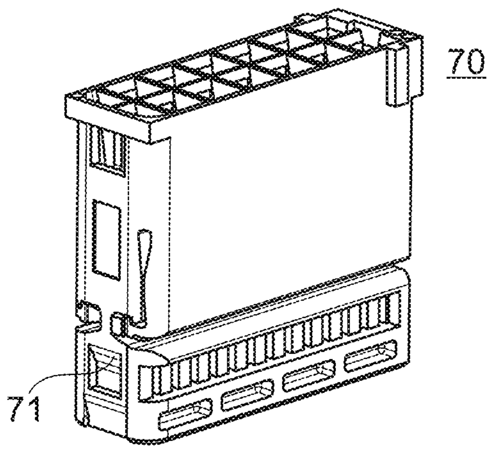
FIG. 5B shows an isometric view of a single connector module according to some embodiments.
Figure 5C:
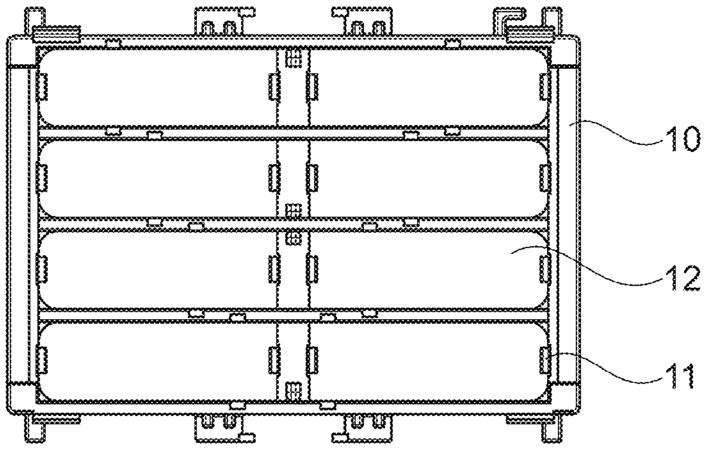
FIG. 5C shows a top view of a preferred embodiment of a connector housing with eight slots according to some embodiments.

FIG. 5A shows for example a 0.50 26-way module, a 0.64 18-way module, a 1.2 14 way module, a 2.80 4-way module and a 4.8 3-way module. Each module has the same length, width and height. In the shown embodiment the length is 26 mm and the width is 8 mm. A single module 70 is shown exemplarily in FIG. 5B.

Other embodiments of electrical connectors 10 can comprise one, two, three, four, five, six, seven or more connector modules 70 and corresponding slots 12 in the connector housing. Exemplary electrical connectors 10 of different sizes and different orientations of the connector modules 70 in the connector housing 10 are shown in FIGS. 12A to 12J.

Figure 6A:
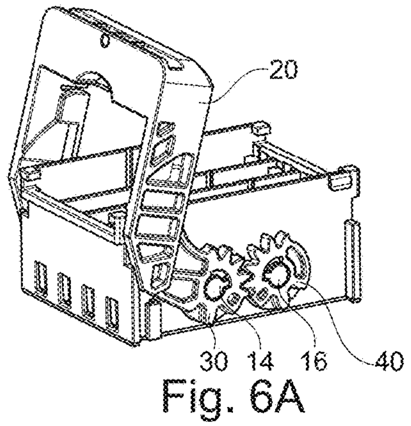
FIG. 6A shows and isometric view of parts of the electrical connector of FIG. 1, in an assembly position according to some embodiments.
Figure 6B:
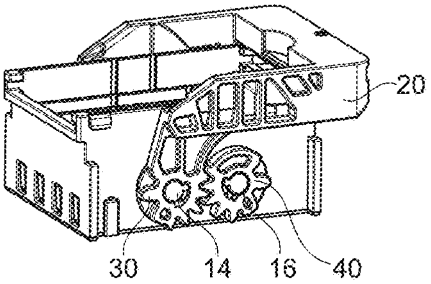
FIG. 6B shows and isometric view of parts of the electrical connector of FIG. 6A in a working position according to some embodiments.
Figure 6C:
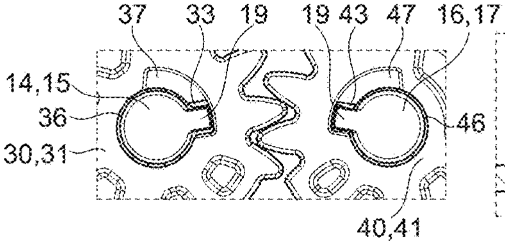
FIG. 6C shows a detailed side view of the electrical connector of FIG. 6A, in an assembly position according to some embodiments.

FIGS. 6A to 6E shown the mounting of the lever 20 and the second gear wheel elements 40, 41 to the rotation pins 14, 15, 16, 17. The rotation pins 14, 15, 16, 17 comprise integral locks 19 for respectively holding the first gear wheel elements 30, 31 and the second gear wheel elements 40, 41 on the first and second rotation pins 14, 15, 16, 17. The locks 19 are small plate like protrusions which extend generally vertical at the outer ends of the rotation pins 14, 15, 16, 17. During mounting these locks 19 can protrude through corresponding slots 33, 43 at bearing holes 36, 46 of the first and second gear wheel elements 30, 40, when the lever 20 and the second gear wheel elements 40, 41 are in a specific mounting position, as shown in FIGS. 6A and 6C. Thereby the lever 20 is rotated by about 75 degrees.

Figure 6D:
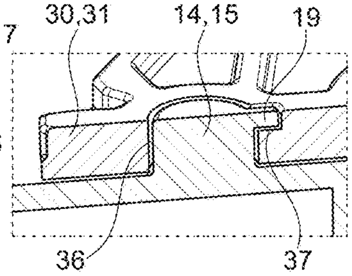
FIG. 6D shows a detailed isometric view of the electrical connector of FIG. 6A in a working position showing a first gear wheel element according to some embodiments.
Figure 6E:
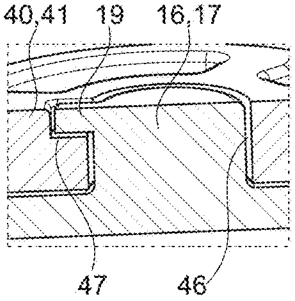
FIG. 6E shows a detailed isometric cross-sectional view of the electrical connector of FIG. 6A in a working position showing a second gear wheel element according to some embodiments.

When the lever 20 and the second gear wheel elements 30, 31 are mounted to the rotation pins 14, 15, 16, 17 the lever 20 and the second gear wheel elements 30, 31 can be rotated to the working positions and the locks 19 travel in groves 37, 47, as shown in FIGS. 6C, 6D and 6E. Thereby, the locks 19 prevent removal of the lever 20 and the second gear wheel elements 30, 31 from the rotation pins 14, 15, 16, 17, as shown in FIGS. 6D and 6E.

Figure 7A:
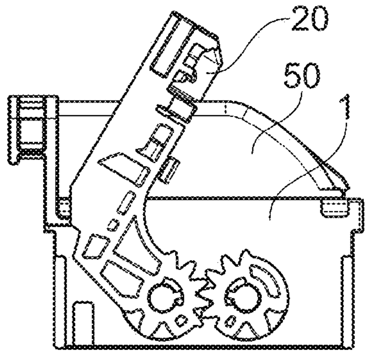
FIG. 7A shows a side view of the electrical connector of FIG. 1 in a pre-assembly position according to some embodiments.
Figure 7B:
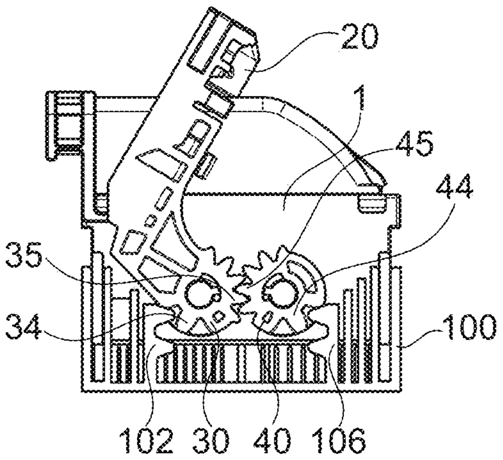
FIGS. 7B to 7E show side views of the electrical connector system of FIG. 2A during a mating procedure according to some embodiments.
Figure 7C:
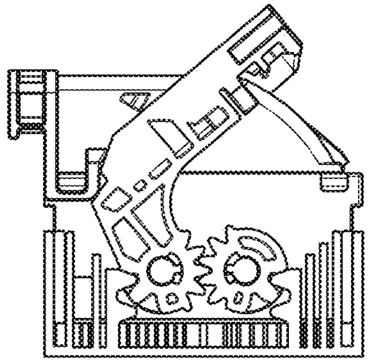
Figure 7D:
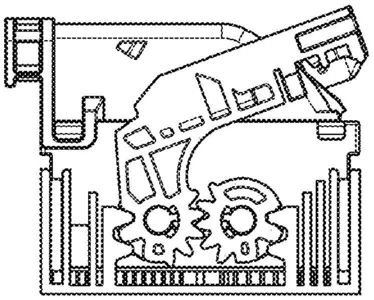
Figure 7E:
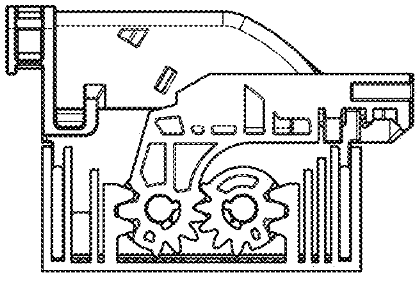
Figure 7F:
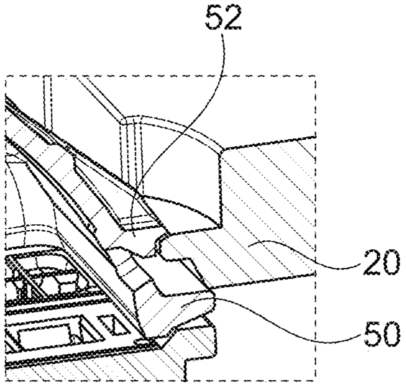
FIG. 7F shows a detailed isometric cross-sectional view of the electrical connector system of FIG. 2A in fully mated position according to some embodiments.

FIGS. 7A to 7E show the mating sequence of the electrical connector 10 with a corresponding counter electrical connector 100. FIG. 7A shows the electrical connector 10 the pre-mating position in which the lever 20 is inclined by about 60 degrees to the horizontal. In this pre-mating position, the electrical connector 10 can be initially inserted into the corresponding counter electrical connector 100 as shown in FIG. 7B. Thereby, the first set of gear teeth 34 initially engages with the teeth of the teethed racks 102, 104 and the third set of gear teeth 44 initially engages with the teeth of the teethed racks 106, 108. As shown in FIGS. 7C to 7E when the lever 20 is rotated the first gear wheel elements 30, 31 rotate as well and the second gear wheel elements 40, 41 do also rotate as they are driven by the first gear wheel elements 30, 31 via the second and third set of gear teeth 35, 45. The engagement of the first set of gear teeth 34 with the teeth of the teethed racks 102, 104 and of the third set of gear teeth 44 with the teeth of the teethed racks 106, 108 the electrical connector 10 is pulled (in FIGS. 7B to 7E downwards) to the counter electrical connector 100. This mating movement ends when the lever 20 is in the fully mated or fully closed or horizontal position and in which the connectors 1, 100 are fully mated, as shown in FIG. 7E. In this fully mated position, the lever 20 locks with the cover 50 by an elastic cover latch 52 that latches the lever 20, as shown in FIG. 7F.

Figure 8A:
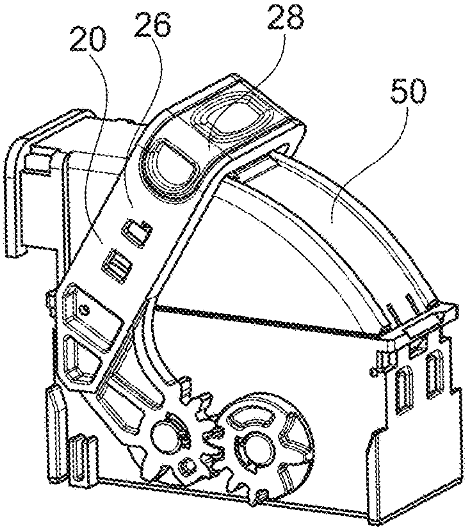
FIGS. 8A to 8D show isometric views of an electrical connector with an alternative lever in different lever positions according to some embodiments.

FIGS. 8A to 12J show a second embodiment of the electrical connector 1, which comprises a telescopically extendable lever 20. The lever 20 of this embodiment comprises a generally U-shaped lever base 26 and a generally U-shaped telescopic lever arm 28 which is slidably attached to the lever base 26, such that the telescopic lever arm 28 can adopt an extended (FIGS. 8B and 8C) and a shortened position (FIGS. 8A and 8D). The lever base 26 basically corresponds functionally to the lever 20 of the first embodiment. The other elements of the electrical connector 1 of the second embodiment correspond to the elements of the first embodiment.

Figure 9A:
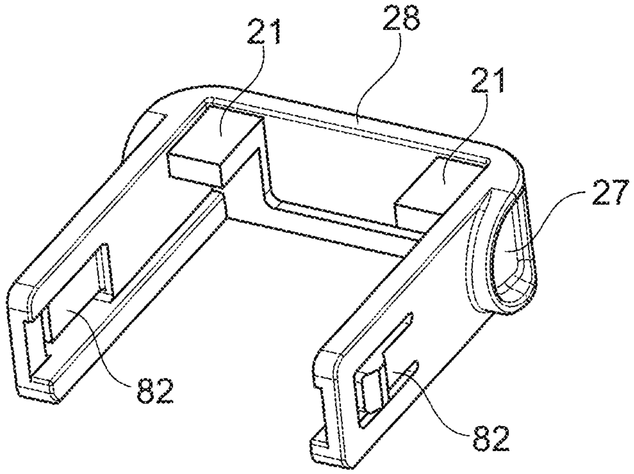
FIGS. 9A to 9C shows an exploded view of a lever base, a telescopic lever arm and a cover of the electrical connector of FIG. 8A according to some embodiments.
Figure 9B:
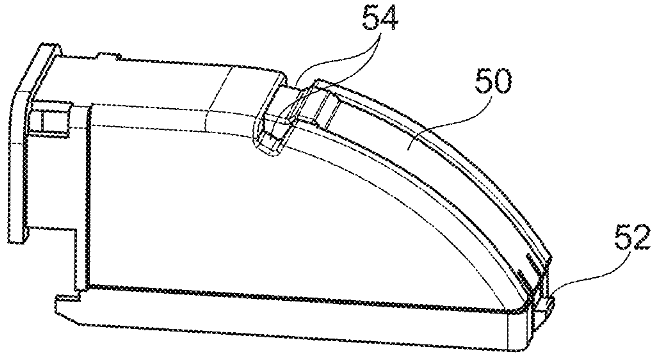
Figure 9C:
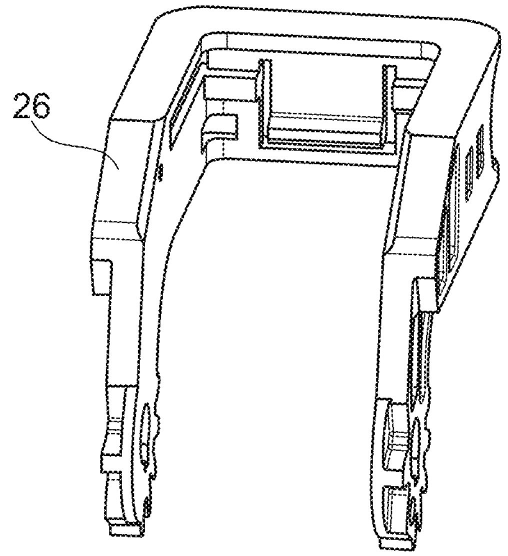

FIG. 8A shows the lever in a pre-mating position in which telescopic lever arm 28 is shortened. In this position the rotational movement of the lever 20 is locked with the cover 20 to ensure this position for facilitating mating of the connectors 1, 100. As shown in FIGS. 9A to 9C, the telescopic lever arm 28 to this end comprises protrusions 21 that are configured to latch within pockets 54 of the cover 50, when the lever 20 is in the pre-assembly position.

Figure 8B:
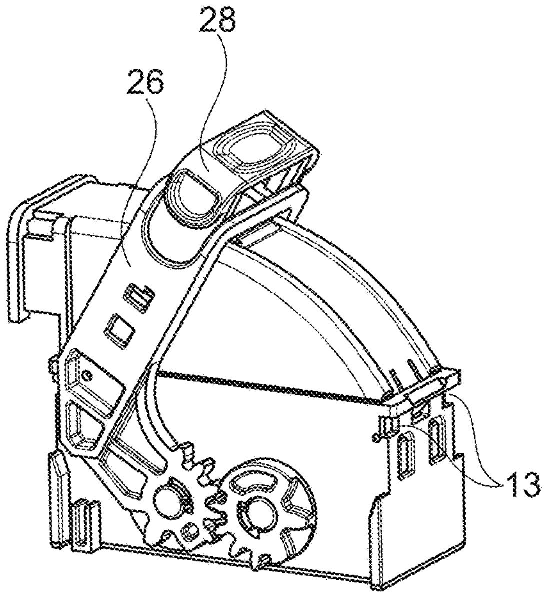

The lever 20 can only be rotated when the telescopic lever arm 28 is extended, as shown in FIG. 8B. To extend the telescopic lever arm 28 it comprises finger pockets 27 at the ends of the crossbar of the telescopic lever arm 28 that can be gripped by the user to pull the telescopic lever arm 28 from the lever base 26.

Figure 8C:
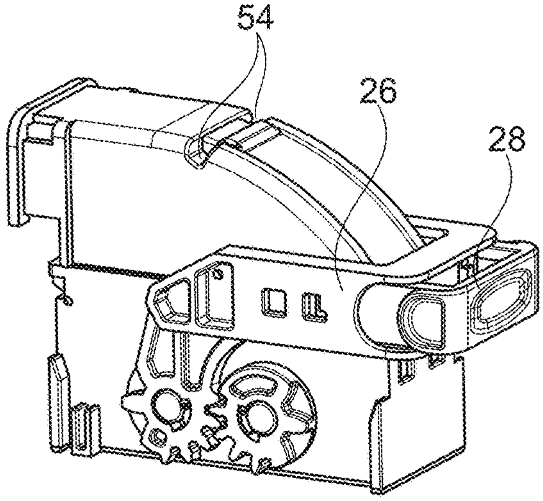
Figure 8D:
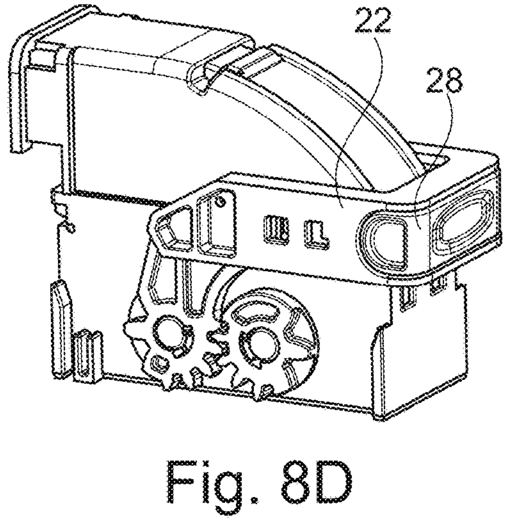

Similarly, the rotational movement of the lever 20 can be locked in the fully closed or fully mated position, as shown in FIG. 8C, by pushing the telescopic lever arm 28 into its shortened position, as shown in FIG. 8D. Thereby the protrusions 21 engage pockets 13 of the housing as shown in FIGS. 8B, 10B and 10D.

Figure 10A:
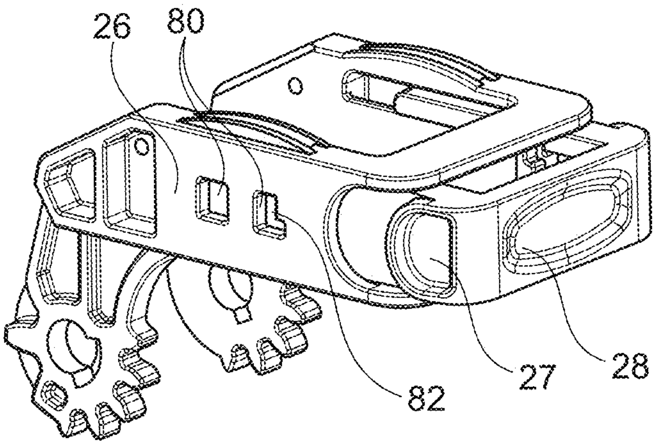
FIG. 10A shows an isometric view of the lever of the electrical connector of FIG. 8A according to some embodiments.
Figure 10B:
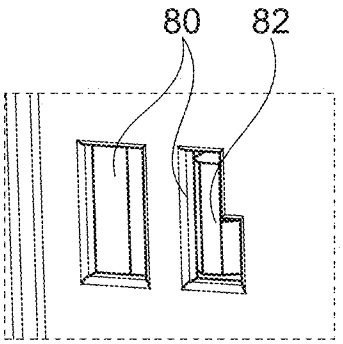
FIG. 10B shows a detailed isometric view of the lever of FIG. 10A according to some embodiments.
Figure 10C:
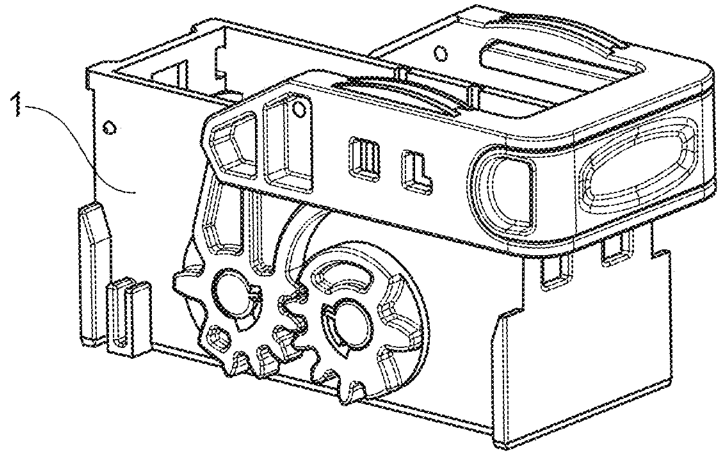
FIG. 10C shows an isometric view of parts of the electrical connector of FIG. 8A according to some embodiments.
Figure 10D:
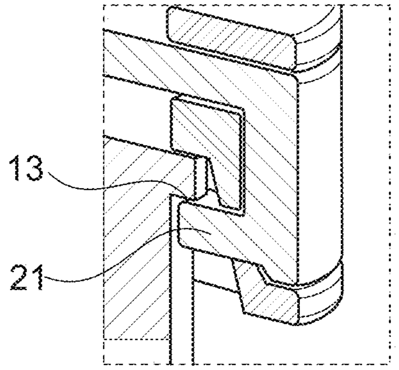
FIG. 10D shows a detailed isometric cross-sectional view of the parts of FIG. 10C according to some embodiments.
Figure 12A:
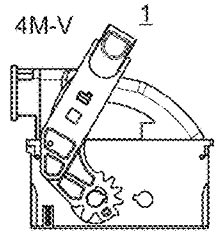
FIGS. 12A to 12J show side views of electrical connectors in different sizes and lever positions according to some embodiments.
Figure 12B:
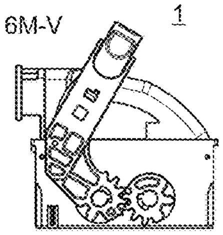
Figure 12C:
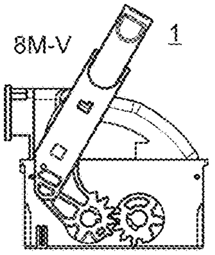
Figure 12D:
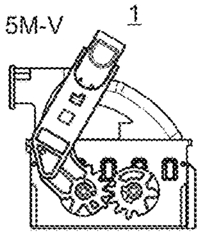
Figure 12E:
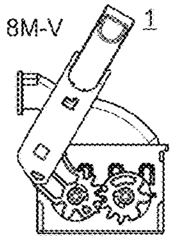
Figure 12F:
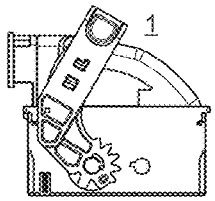
Figure 12G:
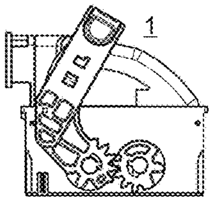
Figure 12H:
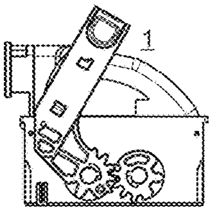
Figure 12I:
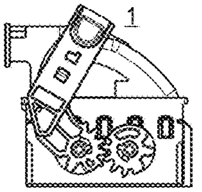
Figure 12J:
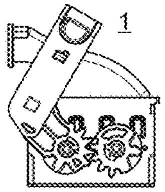

To maintain either the extended or the shortened position the telescopic lever arm 28 comprises elastic latches 82 at both sidebars that engage latching windows 80 of the lever base 26, as shown in FIGS. 10A, 10B. Thus, the user obtains a haptic feedback for these two positions of the telescopic lever arm 28.

FIGS. 11A to 11D show an assembly sequence for mating the electrical connector 100 with a corresponding counter electrical connector 100. In FIG. 11A the electrical connector 100 is in a locked pre-mating condition and can be inserted into the mating opening 110 of the counter electrical connector 100. Then, the telescopic lever arm 28 can be extended to allow a rotational movement of the lever 20 and to increase the length of the lever 20 to facilitate rotation by the user. In FIG. 11B the telescopic lever arm 28 is extended and the lever 20 can be rotated by the user in order to pull the electrical connector 100 and the counter electrical connector 100 together for mating. In FIG. 11C the connectors 1, 100 are in the fully mated position in which the lever 20 adopts a horizontal position. If this position is reached the lever base 26 latches with the cover latch 52 and the user hears an audible click, which indicates that the fully mated position is reached. Then the user can push the telescopic lever arm 28 to its shortened position, as shown in FIG. 11D, where the protrusions 21 of the telescopic lever arm 28 latch within the pockets 13 of the connector housing 10. Thus, the lever arm 20 is again locked against rotation and the electrical connector 10 is in its final, fully mated and secured position.

While this invention has been described in terms of the preferred embodiments thereof, it is not intended to be so limited, but rather only to the extent set forth in the claims that follow. For example, the above-described embodiments (and/or aspects thereof) may be used in combination with each other. In addition, many modifications may be made to configure a particular situation or material to the teachings of the invention without departing from its scope. Dimensions, types of materials, orientations of the various components, and the number and positions of the various components described herein are intended to define parameters of certain embodiments and are by no means limiting and are merely prototypical embodiments.

Many other embodiments and modifications within the spirit and scope of the claims will be apparent to those of skill in the art upon reviewing the above description. The scope of the invention should, therefore, be determined with reference to the following claims, along with the full scope of equivalents to which such claims are entitled.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "includes," and/or "including," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any order of arrangement, order of operations, direction or orientation unless stated otherwise.

The invention claimed is:

1. An electrical connector, comprising:

a connector housing having at least one slot holding a connector module with electrical contacts from a set of connector modules;

a U-shaped lever having a crossbar and two sidebars extending from ends of the crossbar; and a pair of first gear wheel elements, each first gear wheel integrally formed at a respective ends of the sidebars and being rotatable around a pair of first rotation pins extending from an outside of opposing outer side walls of the connector housing, wherein the first gear wheel elements each comprise a first set of gear teeth for meshing with a teethed rack of a counter electrical connector; and the first gear wheel elements each comprise a second set of gear teeth for meshing with second gear wheel elements.

2. The electrical connector according to claim 1, wherein the first set of gear teeth comprise a first rotation radius of the first gear wheel elements around the first rotation pins and wherein the second set of gear teeth comprise a second rotation radius of the first gear wheel elements around the first rotation pins.

3. The electrical connector according to claim 2, wherein the first rotation radius is different to the second rotation radius.

4. The electrical connector according to claim 2, wherein the first rotation radius is smaller than the second rotation radius.

5. The electrical connector according to claim 2, further comprising a pair of second gear wheel elements being rotatable around a pair of second rotation pins extending to the outside at the opposing outer side walls of the connector housing, wherein the second gear wheel elements each comprise a third set of gear teeth and a fourth set of gear teeth.

6. The electrical connector according to claim 5, wherein the third set of gear teeth comprise a third rotation radius of the second gear wheel elements around the rotation pins, wherein the fourth set of gear teeth comprise a fourth rotation radius of the gear wheel elements around the rotation pins, and wherein the third rotation radius is different to the fourth rotation radius.

7. The electrical connector according to claim 6, wherein the second gear wheel elements mesh with and are driven by the first gear wheel elements.

8. The electrical connector according to claim 7, wherein the second set of gear teeth of the first pair of gear wheel elements meshes with the fourth set of gear teeth of the second pair of gear wheel elements and wherein the second rotation radius equals the fourth rotation radius.

9. The electrical connector according to claim 6, wherein the third rotation radius is smaller than the fourth rotation radius.

10. The electrical connector according to claim 6, wherein the third rotation radius equals the first rotation radius.

11. The electrical connector according to claim 1, wherein the connector housing comprises two to eight slots for holding a corresponding number of connector modules from the set of connector modules.

12. The electrical connector according to claim 1, wherein the first rotation pins comprises integral locks for holding the first gear wheel elements on the first rotation pins.

13. The electrical connector according to claim 1, wherein the second rotation pins comprises integral locks for holding the second gear wheel elements on the second rotation pins.

14. The electrical connector according to claim 1, further comprising a cover attached to a top side of the housing, wherein the cover comprises a cover latch that latches with the lever, when the lever is in a fully closed position in which the electrical connector fully engages its counter electrical connector.

15. The electrical connector according to claim 1, wherein the lever comprises a lever base and a telescopic lever arm slidably attached to the lever base such that the telescopic lever arm can assume an extended and a shortened position.

16. The electrical connector according to claim 15, wherein the telescopic lever arm comprises protrusions that are configured to latch within pockets of a cover, when the lever is in a pre-assembly position and when the telescopic lever arm assumes the shortened position.

17. The electrical connector according to claim 16, wherein the protrusions are additionally configured to latch within pockets of the connector housing when the lever is in a fully closed position and when the telescopic lever arm assumes the shortened position.

18. The electrical connector according to claim 1, wherein the first rotation pins are offset from a center of the outer side walls in reference to a longitudinal extension direction of said walls.

19. An electrical connector assembly, comprising:

the electrical connector according to claim 1; and a counter connector, wherein the counter connector comprises teethed racks having two teeth.

20. An electrical connector assembly, comprising:

the electrical connector according to claim 1; and a counter connector, wherein the counter connector comprises teethed racks having four teeth.

* * * * *